(12) United States Patent
Pütz et al.

(10) Patent No.: US 12,054,655 B2
(45) Date of Patent: Aug. 6, 2024

(54) PRESSURE-SENSITIVE ADHESIVE FOR PAPER BONDS

(71) Applicant: tesa SE, Norderstedt (DE)

(72) Inventors: Benjamin Pütz, Neuss (DE); Ralf Kretzmer, Hamburg (DE)

(73) Assignee: tesa SE, Norderstedt (DE)

( * ) Notice: Subject to any disclaimer, the term of this patent is extended or adjusted under 35 U.S.C. 154(b) by 440 days.

(21) Appl. No.: 17/126,416

(22) Filed: Dec. 18, 2020

(65) Prior Publication Data

US 2021/0189191 A1  Jun. 24, 2021

(51) Int. Cl.
| | | |
|---|---|---|
| C09J 7/38 | (2018.01) | |
| C08F 220/06 | (2006.01) | |
| C08F 220/20 | (2006.01) | |
| C08F 220/28 | (2006.01) | |
| C08F 226/02 | (2006.01) | |
| C09J 7/21 | (2018.01) | |
| C09J 7/35 | (2018.01) | |

(52) U.S. Cl.
CPC ............ C09J 7/385 (2018.01); C08F 220/06 (2013.01); C08F 220/20 (2013.01); C08F 220/285 (2020.02); C08F 226/02 (2013.01); C09J 7/21 (2018.01); C09J 7/35 (2018.01); *C09J 2301/30* (2020.08); *C09J 2433/00* (2013.01)

(58) Field of Classification Search
CPC ... C09J 7/385; C09J 7/35; C09J 133/14; C09J 2301/414; C09J 2433/00; C08F 220/06; C08F 220/20; C08F 220/285; C08F 226/02; C08F 220/282; C08F 220/54
See application file for complete search history.

(56) References Cited

U.S. PATENT DOCUMENTS

| | | | |
|---|---|---|---|
| 4,388,432 A | 6/1983 | Eskay | |
| 5,512,612 A * | 4/1996 | Brown | C09J 133/08 |
| | | | 525/228 |
| 5,609,932 A * | 3/1997 | Goetz | C09J 7/38 |
| | | | 428/350 |
| 7,067,581 B2 | 6/2006 | Husemann et al. | |
| 9,260,631 B2 | 2/2016 | Husemann et al. | |
| 9,475,966 B2 | 10/2016 | Ellringmann et al. | |
| 2004/0260030 A1 | 12/2004 | Husemann et al. | |
| 2013/0295356 A1 | 11/2013 | Husemann et al. | |
| 2015/0175852 A1 | 6/2015 | Ellringmann et al. | |

FOREIGN PATENT DOCUMENTS

| | | |
|---|---|---|
| DE | 10 2010 043 881 A1 | 5/2012 |
| EP | 0 699 726 A2 | 3/1996 |
| EP | 1 489 153 A1 | 12/2004 |
| JP | H 11 323292 A | 11/1999 |
| JP | 2018 159018 A | 10/2018 |
| WO | 95 14746 A2 | 6/1995 |
| WO | 2014 001096 A1 | 1/2014 |
| WO | WO-2019123182 A1 * | 6/2019 ............... C08F 2/48 |

* cited by examiner

*Primary Examiner* — Scott R. Walshon
(74) *Attorney, Agent, or Firm* — Norris McLaughlin, P.A.

(57) ABSTRACT

A repulpable pressure-sensitive adhesive useful on polar and apolar papers and storage-stable comprises a polymer whose parent monomer composition comprises:

a) 10 to 30 wt % of at least one compound of the formula (I)

$$CH_2=CH-C(O)NR^1R^2 \qquad (I),$$

wherein $R^1$ is an unsubstituted alkyl group, a hydroxyalkyl group or an acetonyl radical and $R^2$ is a hydrogen atom, an unsubstituted alkyl group, a hydroxyalkyl group, an acetonyl radical or an aminoalkyl group;

b) 60 to 80 wt % of at least one compound of the formula (II)

$$CH_2=CH-C(O)O-(CH_2)_2-O-R^3 \qquad (II),$$

wherein $R^3$ is an unsubstituted alkyl group, an alkoxyalkyl group or a (polyalkoxy)alkyl group; and c) 0.5 to 10 wt % of at least one monomer selected from the group consisting of acrylic acid, methacrylic acid and ($C_2$-$C_4$ hydroxyalkyl) acrylates.

Also disclosed is an adhesive tape comprising the pressure-sensitive adhesive, and use of the pressure-sensitive adhesive and/or the adhesive tape for producing water-soluble bonds.

9 Claims, No Drawings

PRESSURE-SENSITIVE ADHESIVE FOR PAPER BONDS

This application claims priority of German Patent Application No. 10 2019 220 303.5, filed on Dec. 19, 2019, with the German Patent Office, the disclosure of which is incorporated herein in its entirety by reference.

The invention relates to the technical field of pressure-sensitive adhesives, of the kind utilized in the art widely for the temporary and permanent joining of substrates. More specifically the invention proposes a pressure-sensitive adhesive based on a specific poly(meth)acrylate that is suitable especially for the bonding of paper and, furthermore, for the production of bonds removable by washing.

Both in the production and in the use of papers, pressure-sensitive adhesives are employed in numerous instances. Important applications lie, for example, in roll changeover during the processing of large rolls of paper; here, pressure-sensitive adhesives are used in what are called Splicing tapes, in order to enable an uncomplicated changeover, as rapidly as possible, from one roll to the next and hence to enable continuous operation. Also common place, furthermore, are permanent splices, which remain temporarily or permanently in the paper. Frequently as well, at the start of winding into a roll, the paper is adhered to the roll core (core starting), or the outer ply of rolls of paper is fastened with an adhesive tape during storage or transport (end tabbing).

In paper production and paper processing, exacting requirements are imposed on the pressure-sensitive adhesives employed. The adhesives are frequently to exhibit high initial tack—consider roll changeover on the fly, where the short contact time between the outgoing roll and the newly introduced roll must be enough to develop a bond between the two paper webs that withstands the shearing forces prevailing at the current web speed and that ultimately is also stronger than the splitting force that is needed to open the roll closure (splittable labels, known as butterflies) or the splitting system integrated in the adhesive tape.

Naturally, the pressure-sensitive adhesives are also intended to exhibit generally high peel adhesion forces, which are developed both on polar and on less polar papers. Especially for permanent bonds, there is also a need for high ageing stability, which is manifested, for example, in a high level of resistance to inwardly migrating calcium ions from white-coated or $CaCO_3$-filled paper. From the standpoint of sustainability, there is frequently a requirement that the adhesives be redetachable from the paper substrate, at least in water (repulpability).

The aspect of the redetachability of a pressure-sensitive adhesive from the substrate for bonding is also of particular interest in technical fields outside the paper industry; for example, this is also an increasingly frequent requirement for bonds of primary/secondary batteries in electronic devices such as mobile phones, etc.

There has therefore been no lack of attempts to provide pressure-sensitive adhesives which satisfy the profile of requirements described.

WO 2014/001096 A1 describes a pressure-sensitive adhesive comprising at least one polymer component based on a monomer mixture comprising at least the following monomers:

i.a) 50 to 89.5 wt % of at least one acrylic ester and/or methacrylic ester having the following formula:

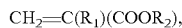

where
$R_1$=H and $R_2$ is a linear alkyl radical having 2 to 10 carbons or a branched, non-cyclic alkyl radical having at least 4 carbons
and/or
$R_1$=$CH_3$ and $R_2$ is a linear alkyl radical having 8 to 10 carbons or a branched, non-cyclic alkyl radical having at least 10 carbons,
i.b) 5 to 20 wt % of at least one N-alkyl-substituted acrylamide,
i.c) 5 to 25 wt % of at least one acrylic ester and/or methacrylic ester having the following formula:

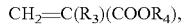

where $R_3$=H or $CH_3$ and $R_4$ is a linear alkyl radical having at least 12 carbons;
i.d) 0.5 to 5 wt % of acrylic acid and/or methacrylic acid, where the quantity figures are based in each case on the monomer mixture, and this pressure-sensitive adhesive is intended for the bonding of flexible printing plates.

A subject of WO 95/14746 A2 is a water-soluble or water-dispersible pressure-sensitive adhesive which comprises a normally tacky copolymer of a water-soluble base monomer and a water-dispersible macromer.

EP 0 699 726 A2 discloses a water-soluble pressure-sensitive adhesive comprising 100 parts by weight of a water-soluble copolymer of
a) 65-95 wt % of a vinylcarboxylic acid,
b) 5-35 wt % of an alkyl(meth)acrylic ester having 1-12 carbons in the alkyl radical and
c) 0.05-5.0 wt % of a polymerizable photoinitiator
and
30 to 150 parts by weight of a water-soluble plasticizer having a molar mass of up to 4000 daltons.

EP 1 489 153 A1 describes a repulpable pressure-sensitive adhesive which comprises at least one polyacrylate-based block copolymer.

There is an ongoing demand for adhesive tapes having a good profile of properties for paper bonds. It was an object of the invention to provide a repulpable pressure-sensitive adhesive which can be used effectively both on polar and on apolar papers and is stable in storage.

The achievement of the object is based on the concept of using a poly(meth)acrylate having a specific parent monomer composition in a pressure-sensitive adhesive. A first and general subject of the invention is therefore a pressure-sensitive adhesive which comprises at least one polymer whose parent monomer composition comprises a) 10 to 30 wt % of at least one compound of the formula (I)

in which $R^1$ is an unsubstituted alkyl group, a hydroxyalkyl group or an acetonyl radical and $R^2$ is a hydrogen atom, an unsubstituted alkyl group, a hydroxyalkyl group, an acetonyl radical or an aminoalkyl group;

b) 60 to 80 wt % of at least one compound of the formula (II)

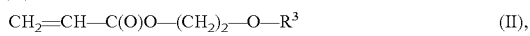

in which $R^3$ is an unsubstituted alkyl group, an alkoxyalkyl group or a (polyalkoxy)alkyl group; and c) 0.5 to 10 wt % of at least one monomer selected from the group consisting of acrylic acid, methacrylic acid and ($C_2$-$C_4$ hydroxyalkyl) (meth)acrylates.

As has emerged, pressure-sensitive adhesives of this kind not only are highly repulpable but also have high tack and exhibit high peel adhesion forces on various papers, and also good shear strengths. Moreover, they have a low tendency to migrate into paper, and have proved to be resistant to the inward migration of calcium ions.

A pressure-sensitive adhesive (PSA) or pressure-sensitive adhesive composition is understood in the invention, and customarily in the general usage, as a material which at least at room temperature is permanently tacky and also adhesive. A characteristic of a PSA is that it can be applied by pressure to a substrate and remains adhering there, with no further definition of the pressure to be applied or the period of exposure to this pressure. In general, though in principle dependent on the precise nature of the PSA and also on the substrate, the temperature and the atmospheric humidity, the influence of a minimal pressure of short duration, which does not go beyond gentle contact for a brief moment, is enough to achieve the adhesion effect, while in other cases a longer-term period of exposure to a higher pressure may also be necessary.

PSAs have particular, characteristic viscoelastic properties which result in the permanent tack and adhesiveness. The feature of these adhesives is that when they are mechanically deformed, there are processes of viscous flow and there is also development of elastic forces of recovery. The two processes have a certain relationship to one another in terms of their respective proportion, in dependence not only on the precise composition, the structure and the degree of crosslinking of the PSA, but also on the rate and duration of the deformation, and on the temperature.

The proportional viscous flow is necessary for the achievement of adhesion. Only the viscous components, frequently brought about by macromolecules with relatively high mobility, permit effective wetting and effective flow onto the substrate where bonding is to take place. A high viscous flow component results in high tack (also referred to as surface stickiness) and hence often also in high adhesion. Highly crosslinked systems, crystalline polymers, or polymers with glasslike solidification lack flowable components and are in general devoid of tack or possess only little tack at least.

The proportion of elastic forces of recovery are necessary for the achievement of cohesion. They are brought about, for example, by very long-chain macromolecules with a high degree of coiling, and also by physically or chemically crosslinked macromolecules, and they allow the transmission of the forces that act on an adhesive bond. As a result of these forces of recovery, an adhesive bond is able to withstand a long-term load acting on it, in the form of a sustained shearing load, for example, to a sufficient degree over a relatively long time period.

For more precise description and quantification of the extent of elastic and viscous components, and also of the relationship between the components, the variables of storage modulus (G') and loss modulus (G") are employed, and can be determined by means of dynamic mechanical analysis (DMA). G' is a measure of the elastic component, G" a measure of the viscous component, of a substance. Both variables are dependent on the deformation frequency and the temperature.

The variables can be determined using a rheometer. In that case, for example, the material under investigation is exposed in a plate/plate arrangement to a sinusoidally oscillating shear stress. In the case of instruments operating with shear stress control, the deformation is measured as a function of time, and the time offset of this deformation is measured relative to the introduction of the shear stress. This time offset is referred to as the phase angle $\delta$.

The storage modulus G' is defined as follows: $G'=(\tau/\gamma)\cdot\cos(\delta)$ ($\tau$=shear stress, $\gamma$=deformation, $\delta$=phase angle=phase shift between shear stress vector and deformation vector). The definition of the loss modulus G" is as follows: $G''=(\tau/\gamma)\cdot\sin(\delta)$ ($\tau$=shear stress, $\gamma$=deformation, $\delta$=phase angle=phase shift between shear stress vector and deformation vector).

A composition is considered in particular to be a PSA, and is defined in particular as such for the purposes of the invention, when at 23° C., in the deformation frequency range from $10^0$ to $10^1$ rad/sec, both G' and G" are situated at least partly in the range from $10^3$ to $10^7$ Pa. "Partly" means that at least a section of the G' curve lies within the window subtended by the deformation frequency range from $10^0$ inclusive up to $10^1$ inclusive rad/sec (abscissa) and by the G' value range from $10^3$ inclusive to $10^7$ inclusive Pa (ordinate), and when at least a section of the G" curve is likewise situated within the corresponding window.

In the invention the monomer composition of the polymer comprises 10 to 30 wt % of at least one compound of the formula (I)

$$CH_2=CH-C(O)NR^1R^2 \qquad (I),$$

in which $R^1$ is an unsubstituted alkyl group, a hydroxyalkyl group or an acetonyl radical and $R^2$ is a hydrogen atom, an unsubstituted alkyl group, a hydroxyalkyl group, an acetonyl radical or an aminoalkyl group. Where two or more such monomers are included, the monomer composition comprises monomers a) at 10 to 30 wt % in total. With the weight fraction range of the monomers a) according to the invention, high initial tack of the PSA and effective repulpability thereof, in particular, are ensured. The monomer composition of the polymer preferably comprises 15 to 28 wt % of at least one compound of the formula (I). Where there are two or more such monomers included, the monomer composition comprises monomers a) preferably at 15 to 28 wt % in total.

The compound of the formula (I) is preferably selected from the group consisting of N-methylacrylamide, N-ethylacrylamide, N-hydroxyethylacrylamide, diacetonylacrylamide, N-isopropylacrylamide, N-ethyl-N-aminoethylacrylamide, N-ethyl-N-hydroxyethylacrylamide, N,N-dimethylacrylamide, N,N-dihydroxymethylacrylamide, N,N-diethylacrylamide and N,N-dihydroxyethylacrylamide.

In one embodiment $R^1$ and $R^2$ independently of one another are an unsubstituted alkyl group; more preferably the compound of the formula (I) is N,N-dimethylacrylamide.

The compound of the formula (II) is preferably selected from the group consisting of methyl diglycol acrylate, ethyl diglycol acrylate, 2-ethoxyethyl acrylate, 2-methoxyethyl acrylate and methoxypolyethylene glycol acrylate. More preferably the compound of the formula (II) is ethyl diglycol acrylate.

Where two or more monomers of the formula (II) are included, the monomer composition comprises monomers b) at 60 to 80 wt % in total.

The monomer composition preferably comprises as monomer c) at least acrylic acid or 2-hydroxyethyl acrylate. Where two or more monomers c) are included, the monomer composition comprises monomers c) at 0.5 to 10 wt % in total.

The parent monomer composition of the polymer in the PSA of the invention may comprise, furthermore, up to 10 wt % of acrylic alkyl esters having 1 to 4 carbons in the alkyl radical.

In one embodiment the parent monomer composition of the polymer in the PSA of the invention comprises
  a) 10 to 30 wt % of N,N-dimethylacrylamide;
  b) ethyl diglycol acrylate and/or 2-ethoxyethyl acrylate at 60 to 80 wt % in total; and
  c) acrylic acid and/or 2-hydroxyethyl acrylate at 0.5 to 10 wt % in total,
where the weight fractions of course are based in each case on the total weight of the monomer composition.

The polymer of the PSA of the invention is preferably crosslinked. More preferably the polymer is thermally crosslinked. Thermal crosslinking can be carried out under substantially milder conditions than, for example, a radiation-induced crosslinking, which occasionally may also be destructive. In the invention, however, it is also possible to bring about crosslinking of the polyacrylate exclusively or additionally through actinic radiation, in which case any crosslinker substances that may be necessary or helpful may be added, examples being UV crosslinkers.

Preferably by then, the polymer of the PSA of the invention is thermally crosslinked, namely crosslinked by means of substances which enable (initiate) and/or promote a crosslinking reaction under the influence of thermal energy. Preferred thermal crosslinkers are coordinative crosslinkers; more preferably the polymer is crosslinked thermally using one or more metal chelates, more particularly using at least one aluminium chelate and/or at least one titanium chelate.

The coordinative crosslinkers, especially aluminium chelates, are used preferably in an amount of 0.1 to 1 part by weight, more preferably of 0.2 to 0.8 part by weight, based in each case on 100 parts by weight of the polymer (solvent-free). In a variant, the coordinative crosslinkers, especially titanium chelates, are used preferably in an amount of 1 to 4 parts by weight, more preferably of 1.7 to 3.3 parts by weight, based in each case on 100 parts by weight of the polymer (solvent-free).

Very preferably the polymer is crosslinked using aluminium acetylacetonate or titanium diisopropoxide bis(acetylacetonate).

To prepare the polymers of the PSA of the invention it is possible in principle to use all radical or radical-controlled polymerizations, including combinations of different polymerization methods. Besides the conventional, free radical polymerization, these are also, for example, ATRP, nitroxide/TEMPO-controlled polymerization or the RAFT process. Preferred solvents for the polymerization are water, acetone, isopropanol, ethanol and ethyl acetate, and also any desired mixtures thereof.

The polymer of the PSA of the invention preferably has a weight-average molar mass $M_w$ of 300,000 to 2,000,000 g/mol.

In one embodiment the PSA of the invention comprises at least one tackifier resin. Tackifier resins, also referred to as tackifier resins, are frequently admixed to PSAs in order to fine-tune the pressure-sensitive adhesive properties.

By "resins" are meant, in particular, those oligomeric and (low)-polymeric compounds whose number-average molar mass $M_n$ is not more than 5000 g/mol. Of course, short-chain polymerization products which are formed during the polymerization for preparing the polymer of the PSA of the invention are not subsumed under the heading of "resins".

Tackifier resins frequently have softening points in the range from 80 to 150° C. The figures relating to the softening point $T_s$ of oligomeric and polymeric compounds, such as of the resins, for example, are based on the ring and ball method according to DIN EN 1427:2007, with corresponding application of the provisions (investigation of the oligomer or polymer sample instead of bitumen, with the procedure otherwise retained). The measures are made in a glycerol bath.

In one embodiment the PSA of the invention comprises at least one tackifier resin selected from the group consisting of rosin and derivatives of rosin such as rosin esters, including rosin derivatives stabilized by disproportionation or hydrogenation, for example; terpene phenolic resins; acrylate resins; and sugar resins.

Tackifier resins are included in the PSA of the invention preferably at a total of not more than 30 wt %. Either one or two or more tackifier resin(s) may be included.

Preferably, however, the PSA of the invention is free from tackifier resins.

In order to optimize the properties of the PSA of the invention it may additionally comprise further, customary additives such as fillers, examples being electrically conductive filling materials, thermally conductive filling materials and the like, or flame retardants, examples being ammonium polyphosphate and its derivatives.

Where the PSA of the invention is to be coloured, it may also comprise water-soluble pigments or other colorants.

Furthermore, the PSA of the invention may also be in foamed form and comprise corresponding blowing agents, especially blowing gases; microstructures, especially hollow microspheres, made of—for example—glass, ceramic or flyash; expandable and/or expanded hollow microspheres having a thermoplastic polymer shell, and the like.

A further subject of the invention is an adhesive tape which comprises a PSA of the invention.

The general expression "adhesive tape" in the sense of the present invention embraces all sheetlike structures such as two-dimensionally extended, at least single-sidedly and full-areally or partly PSA-coated films or film sections, paper or paper sections, tapes with extended length and limited width, tape sections, labels, and diecuts and the like.

At its most simple, an adhesive tape of the invention consists only of a PSA of the invention (adhesive transfer tape). In order to be able to apply the adhesive tape, rolled up as a pancake roll or cross-wound to form a spool, without the adhesive tape sticking to itself, the PSA in this case is lined preferably with at least one release liner.

As well as having a PSA of the invention, an adhesive tape of the invention may also comprise at least one carrier and optionally also further layers as well, examples being further PSA layers, further reinforcing carrier layers, etc.

In one embodiment the adhesive tape comprises a carrier and a layer of a PSA of the invention. The material of the carrier is preferably selected from the group consisting of polyethylene (PE), polypropylene (PP), polyethylene terephthalate (PET) and paper. More particularly the carrier material is paper.

In the embodiment with carrier, the adhesive tape of the invention may be configured as a single-sided or double-sided adhesive tape. Additionally, the adhesive tape of the invention may also be configured as a splittable adhesive tape.

Also in the embodiment with carrier, at least one PSA of the adhesive tape is preferably lined with a release liner, in order to enable trouble-free unwinding and to protect the PSA or PSAs from soiling. Release liners typically consist of a single-sidedly or double-sidedly siliconized polymeric film (e.g. PET or PP) or of a siliconized paper carrier. They are not part of the adhesive tape, being instead connected only temporarily to the tape, as a form of assistance.

With particular preference, in an adhesive tape of the invention, the PSA of the invention is lined with a repulpable release liner.

A further subject of the invention is the use of a PSA of the invention and/or of an adhesive tape of the invention for producing water-soluble bonds. "Water-soluble bonds" are bonds in the case of which, under the influence of water, the bonded substrates can be parted from one another with a manageable and technically reasonable effort in complexity in terms of time and apparatus. The concept does not include the PSA or the adhesive tape being removable without residue from the substrate. Preferably, however, the PSA of the invention is removable without residue from a substrate bonded using it. Preferred substrates in this context are papers and constituents of battery cells.

A further subject of the invention is the use of a PSA of the invention and/or of an adhesive tape of the invention for producing repulpable bonds.

The uses according to the invention preferably encompass the use of a PSA of the invention and/or of an adhesive tape of the invention for producing bonds, where at least one of the substrates to be bonded is paper. More preferably both substrates to be bonded are paper. Preferred bonds in this context are, for example, the bonding of papers splittable in the z-direction to paper rolls, serving in particular for temporary roll fastening; the production of permanent splices between two paper rolls; bonds of white-coated or calcium carbonate-filled paper; the adhering of paper to a roll core (core starting); and the fastening of the outer paper ply of a roll of paper (end tabbing).

EXAMPLES

Measurement Methods
Gel Permeation Chromatography (GPC, Measurement Method A):

The figures for number-average and weight-average molecular weights $M_n$ and $M_w$ in this text are based on the determination by gel permeation chromatography.

The determination is made on a 100 μL sample which has undergone clarifying filtration (sample concentration 0.5 g/L). The eluent used is tetrahydrofuran containing 0.1 vol % of trifluoroacetic acid. Measurement takes place at 25° C. The pre-column used is a column of type PSS-SDV, 10 μm, ID 8.0 mm·50 mm. Separation takes place using columns of the type PSS-SDV, 5 μm, $10^3$ Å (SN9090201) and also 5 μm, $10^2$ Å (SN9090200) each of ID 8.0 mm×300 mm (columns from Polymer Standards Service; detection by PSS-SECurity 1260 RID differential refractometer). The flow rate is 0.5 mL per minute. Calibration is made against PMMA standards (polymethyl methacrylate calibration).

Determination of Repulpability According to Tappi UM 213 (Measurement Method B):

The test paper used is "fluffed pulp" (Co. Machery-Nagel MN 270, 270 g/m²).

A three-layer assembly was produced, by bonding the test paper over its full area on both sides with the adhesive under investigation. The samples thus prepared were cut into pieces measuring 13×13 mm and were made up with test paper pieces of the same size in a beaker up to a weight of 15 g.

The samples together with 500 ml of mains water were placed in a mixer (Waring Blender Model 34BL47).

The blender contents were then mixed at around 15,000 rpm for 20 s. After that, the mixer was halted and residues of paper were washed back into the pulp from the edges of the mixer using mains water. This procedure was repeated twice, giving a total mixing time of 60 s. The resulting pulp was referred to as pulp 1.

The entire pulp 1 was placed in a disperser containing 2 l of mains water. Rinsing was carried out with mains water in order to transfer the pulp 1 without residue. The disperser was then made up with mains water to 5 l. Dispersing was carried out for 1 min, after which five beakers were each filled with 770 ml of the pulp 1 diluted accordingly; of these beakers, the first, third and fifth were used to produce test sheets.

For this purpose, the contents of a beaker were placed into a cylinder and made up with mains water to 7 l. Then air was blown through for 20 s and a waiting time of 20 s was observed in order to allow the foam to settle and the fibres to undergo self-orientation. The water was then withdrawn by suction through a sieve inserted in the base of the cylinder, after which vacuum was applied for 1 min.

The freshly formed sheet was covered with an outer card (substituted chromo card, 240 mm diameter, Estanit) (smooth side downwards) and rolled down with a 2 kg steel roller. The resulting assembly was removed, and the free side was covered with an outer paper (paper B13-c, 205 mm diameter, Estanit). This assembly was dried under reduced pressure at 100° C. in a drier for around 5 min.

After drying had taken place, the outer cards were carefully detached and the test sheet was examined for fibre extraction. Fibre extraction indicates residual stickiness, which is brought about as a result of inadequate repulpability on the part of the adhesive.

Ideally the outer cards can be removed without disruption, and the test sheet has two completely smooth sides. Slight fibre extraction was considered still to be adequate.

The test sheet was also examined both in transmitted light and in direct light for particles (specks). To pass the test, there must have been no particles apparent in the test sheet.

The test result recorded was "repulpable yes/no".

Peel Adhesion (Measurement Method C):

The peel adhesion was determined at 23° C.+/−1° C. temperature and 50%+/−5% relative humidity.

The paper substrates used were stored continually beforehand under test conditions.

The paper substrates used were as follows:
Raflatac 1600.9 label paper, bonded on a planer PE plate;
$CaCO_3$-containing paper: MediaPrint Silk 250 g, Stora Enso Uetersen, 100% $CaCO_3$ in the coating; fastened on a PE plate using Tesa® 4965,
wallpaper top paper 44540, 90 g/m², Koehler SE; fastened on a PE plate using Tesa® 4965.

A strip of the adhesive under investigation, 20 mm wide and 250 mm long, was applied to the relevant paper. The pressure-sensitive adhesive strip was pressed on twice to the substrate with an applied pressure corresponding to a weight of 2 kg. The adhesive under investigation was subsequently peeled from the paper substrate
immediately and
in the case of the measurement on $CaCO_3$-containing paper, additionally after storage of the bond for 3 d at 40° C./80% relative humidity and a subsequent 20 h under test conditions
at a velocity of 300 mm/min and at an angle of 180°. The force required to achieve this was recorded using a tensile testing machine. The measurement results are reported in N/cm and are averages from three measurements.

Splitting Force (Measurement Method D):

This test determines the split resistance of a paper in the z-direction. The split resistance or splitting force is the force needed in order to split the paper body in the z-direction.

The adhesive under investigation was applied to a splitting paper (paper splittable in the z-direction, 69 μm, 73 g/m², splitting energy <30 cN/cm) on both sides by initial stroking with the finger in order to avoid air inclusions and subsequent rolling down twice with a manual roller. This bond was produced in a manner such that the ends of the strip of adhesive projected beyond the test element on one side and could be folded onto themselves and stuck together to form a finger tab. The measurements were made immediately and also after storage of the test specimen for 1 month at 40° C. and 80% relative humidity.

Strips 15 mm wide with a length of 20 cm were cut from the assembly using a steel rule. The finger tabs were pulled apart by hand until splitting of the paper became apparent.

The test specimen was clamped into a tensile testing machine using the finger tabs, freely hanging, at the top and bottom, and the strip was pulled apart with a velocity of 300 mm/min (measured in conditions 23° C., 50% relative humidity).

The force required to achieve this was recorded and is reported in Table 2 as the mean value from five measurements.

Rolling Ball Tack Test (Measurement Method E):

In this test, a steel ball with a weight of 5.6 g rolled from a ramp at a height of 65 mm onto a horizontal strip of the adhesive under test. The distance travelled by the ball before it came to rest was measured (test conditions 23° C., 50% relative humidity).

Prior to the measurement, the balls were cleaned with wadding and acetone and acclimatized under test conditions for 30 minutes, uncovered.

Prior to the measurement the adhesive was acclimatized under test conditions for 1 day.

Production of the Adhesives:

A 300 L reactor conventional for radical polymerizations was charged with a total of 100 kg of the monomers specified in Table 1, in accordance with the composition likewise specified there, and also with 72.4 kg of ethanol/water (70:30). After nitrogen gas had been passed through the reactor with stirring for 45 minutes, the reactor was heated up to 58° C. and 50 g of Vazo® 67 were added. The jacket temperature was then raised to 80° C. and the reaction was carried out constantly at a jacket temperature of 70° C. After a reaction time of 1 h a further 50 g of Vazo® 67 were added. To reduce the residual initiators, a further 50 g of Vazo® 67 were added after 6 h. After a reaction time of 24 h, the reaction was discontinued and the batch was cooled to room temperature. The solution was adjusted to a solids content of 30 wt %. The crosslinker specified in each case was then incorporated with stirring.

The resulting composition was coated in solution onto a siliconized PET film using a comma bar. The solvent was removed in a drying tunnel (20 min, 80° C.). The composition thus obtained was laminated, as the adhesive under investigation, onto a backing which is reported in each case for the test methods; the coat weight was 50 g/cm².

TABLE 1

Composition of the adhesives

| | Monomers (wt %, based on the monomer composition) | | | | | Crosslinkers (wt %, based on polymer) | |
|---|---|---|---|---|---|---|---|
| No. | Acrylic acid | 2-Hydroxyethyl acrylate | N,N-Dimethylacrylamide | Ethyl diglycol acrylate | n-Butyl acrylate | Aluminium acetylacetonate | Titanium diisopropoxide bis (acetylacetonate) |
| 1* | 5 | | | | 95 | 0.33 | |
| 2* | 10 | | | | 90 | 0.33 | |
| 3* | | 22 | 28 | 35 | 15 | 0.33 | |
| 4 | 5 | | | 20 | 75 | 0.33 | |
| 5 | 5 | | | 30 | 65 | 0.33 | |
| 6 | 10 | | | 10 | 80 | 0.33 | |
| 7* | | 10 | | | 90 | | 2 |
| 8* | | 20 | | | 80 | | 2 |
| 9 | 1 | | 30 | | 69 | | 2 |
| 10 | 3 | | 20 | | 77 | | 2 |
| 11 | 5 | | 30 | | 65 | | 3 |
| 12 | 10 | | 10 | | 80 | | 3 |

*Comparative example

TABLE 2

Test results

| | | Peel adhesion (N/cm) | | | | Splitting force | |
|---|---|---|---|---|---|---|---|
| No. | Repulpability | Label paper | CaCO₃ paper (immediate/after storage) | Wallpaper top paper | Rolling ball (mm) | Immediate | After storage (1 month at 40° C./80% relative humidity) |
| 1* | No | | | | | | |
| 2* | No | | | | | | |
| 3* | Yes | 7.7 | 6.42/3.73 | 6.2 | 208 | not determined | not determined |
| 4 | Yes | 7.8 | 7.0/7.0 | 8.2 | 56 | 29 | 27.2 |
| 5 | Yes | 8 | 6.5/6.0 | 7.95 | 78 | 29.2 | 27.5 |
| 6 | Yes | 8.4 | | 6.5 | 83 | 29.2 | 28.1 |
| 7* | No | | | | | | |
| 8* | No | | | | | | |
| 9 | Yes | 7.2 | | 7.7 | 41 | 26.9 | 44.1 |
| 10 | Yes | 7 | | 7.2 | 9 | 30.2 | 37.6 |
| 11 | Yes | 7.3 | 8.5/7.9 | 8.8 | 80 | 29.3 | 33.8 |
| 12 | Yes | 6.3 | | 6.9 | 34 | 29.3 | 33.6 |

*Comparative example

The invention claimed is:

1. A repulpable pressure-sensitive adhesive comprising at least one polymer whose parent monomer composition comprises:
   a) 10 to 30 wt % of at least one compound of the formula (I)

$$CH_2=CH-C(O)NR^1R^2 \qquad (I),$$

in which $R^1$ is an unsubstituted alkyl group and $R^2$ is a hydrogen atom, or an unsubstituted alkyl group;
   b) 60 to 80 wt % of ethyl diglycol acrylate; and
   c) 0.5 to 10 wt % of at least one monomer selected from the group consisting of acrylic acid, methacrylic acid, and ($C_2$-$C_4$ hydroxyalkyl) acrylates.

2. The pressure-sensitive adhesive according to claim 1, wherein $R^1$ and $R^2$ independently of one another are an unsubstituted alkyl group.

3. The pressure-sensitive adhesive according to claim 1, wherein monomer c) comprises acrylic acid or 2-hydroxyethyl acrylate.

4. The pressure-sensitive adhesive according to claim 1, wherein the polymer is thermally crosslinked.

5. An adhesive tape comprising the pressure-sensitive adhesive according to claim 1.

6. A method of bonding a substrate with a water-soluble bond, said method comprising bonding the substrate with the pressure-sensitive adhesive according to claim 1.

7. A repulpable pressure-sensitive adhesive comprising at least one polymer whose parent monomer composition comprises:
   a) 10 to 30 wt % of N,N-dimethylacrylamide;
   b) 60 to 80 wt % of ethyl diglycol acrylate; and
   c) 0.5 to 10 wt % of at least one monomer selected from the group consisting of acrylic acid and 2-hydroxyethyl acrylate.

8. An adhesive tape comprising the pressure-sensitive adhesive according to claim 7.

9. A method of bonding a substrate with a water-soluble bond, said method comprising bonding the substrate with the pressure-sensitive adhesive according to claim 7.

* * * * *